United States Patent [19]

Fujitaka et al.

[11] Patent Number: 4,527,839
[45] Date of Patent: Jul. 9, 1985

[54] SYNTHETIC WHEEL FORMED FROM TWO HALVES

[75] Inventors: Nobuo Fujitaka, Saitama; Masaru Fujisaki, Tokyo; Yoshitoshi Hagiwara, Saitama, all of Japan

[73] Assignee: Honda Giken Kogyo Kabushiki Kaisha, Tokyo, Japan

[21] Appl. No.: 487,735

[22] Filed: Apr. 22, 1983

[30] Foreign Application Priority Data

Apr. 30, 1982 [JP] Japan .................................. 57-73083
Apr. 30, 1982 [JP] Japan .................................. 57-73084
Apr. 30, 1982 [JP] Japan .................................. 57-78085
Apr. 30, 1982 [JP] Japan .................................. 57-78086
Apr. 30, 1982 [JP] Japan .................................. 57-73087

[51] Int. Cl.³ .......................... B60B 5/02; B60B 3/10
[52] U.S. Cl. .......................... 301/63 DD; 301/63 PW; 301/64 SH
[58] Field of Search ............... 301/5 VH, 63 R, 63 C, 301/63 D, 63 DD, 63 DS, 63 DT, 65, 66, 63 PW, 64 SH

[56] References Cited

U.S. PATENT DOCUMENTS

| | | | |
|---|---|---|---|
| 1,201,551 | 10/1916 | Bryant | 301/5 VH |
| 1,602,796 | 10/1926 | Jacob et al. | 301/64 SH |
| 2,948,568 | 8/1960 | Hykes et al. | 301/63 D |
| 3,695,728 | 10/1972 | Haussels | 301/63 DD |
| 3,862,779 | 1/1975 | Jayne | 301/64 SH X |
| 4,072,358 | 2/1978 | Ridha | 301/63 PW |
| 4,114,953 | 9/1978 | Baumgartner | 301/63 DD |
| 4,351,382 | 9/1982 | Corner et al. | 301/98 X |

*Primary Examiner*—David A. Scherbel
*Attorney, Agent, or Firm*—Armstrong, Nikaido, Marmelstein & Kubovcik

[57] ABSTRACT

A wheel for vehicles comprising a wheel body consisting of a rim portion, spoke portions and a hub portion, and two bearings disposed at the left and right of the hub portion. The wheel body is integrally made of a fiber-reinforced resin and is composed of symmetrical left and right halved bodies. Each spoke portion has a square hollow cross section and is formed including matching flanges of the respective spoke portions of the halved bodies. The flanges are joined together by a bonding agent and mechanical fasteners. The rim portions has a circumferential synthetic resin film coating and a cylindrical projection extending radially inwardly with an air valve fitting hole therethrough.

5 Claims, 8 Drawing Figures

SYNTHETIC WHEEL FORMED FROM TWO HALVES

BACKGROUND OF THE INVENTION

1. Field of the Invention

The present invention relates to a wheel for vehicles, particularly to a wheel for small-sized vehicles such as motorcycles and motored tricycles.

2. Description of Relevant Art

There have been proposed, for small-sized vehicles such as motorcycles and motored tricycles, wheels each composed of a ring-like rim member, a hub member disposed in the center of the rim member, a plurality of spoke members radially arranged between the rim member and the hub member and a pair of bearing members provided at both ends of the hub member.

As a matter common to component parts of the small-sized vehicle, it has been a problem for such wheels to have a weight as light as possible, while keeping the necessary strength.

The present invention has been achieved to favorably solve such problem.

SUMMARY OF THE INVENTION

According to the present invention there is provided a wheel for vehicles, comprising a wheel body consisting of a rim portion, a plurality of spike portions and a hub portion and a pair of bearings provided at the left and right of the hub portion, the wheel body being integrally made of a fiber-reinforced resin.

The wheel body may be composed of left and right halved bodies integrally joined with each other.

Moreover, each of the spoke portions may have a hollow core formed therein.

Further, the rim portion may have a cylindrical projection projecting radially inwardly of the wheel body, the projection being formed therethrough with an air valve fitting hole. Furthermore, the rim portion may have its outer circumference thereof coated with a synthetic resin film.

Still further, the outer circumference of the rim portion may be formed thereon with a bead stopper.

An object of the present invention is to provide a wheel for vehicles, which favorably permits reduction in the number of component parts as well as minimal weight.

Another object of the invention is to provide a wheel for vehicle, which permits a favorable light weight while keeping the necessary strength.

Still another object of the invention is to provide a wheel for vehicles, which permits the provision of an air valve fitting portion while giving a uniform ring rigidity.

It is also an object of the invention to provide a wheel for vehicles, which permits a favorable improvement of airtightness in the contact area between a tire and rim portion.

It is still another object of the invention to provide a wheel for vehicles, which permits a favorable prevention of slipout or slippage of a bead portion of a tire.

The above and further features, objects and advantages of the present invention will more fully appear from the following detailed description of the preferred embodiments of the invention when the same is read in conjunction with the accompanying drawings.

BRIEF DESCRIPTION OF THE ACCOMPANYING DRAWINGS

DETAILED DESCRIPTION OF THE PREFERRED EMBODIMENTS

Figure 1:
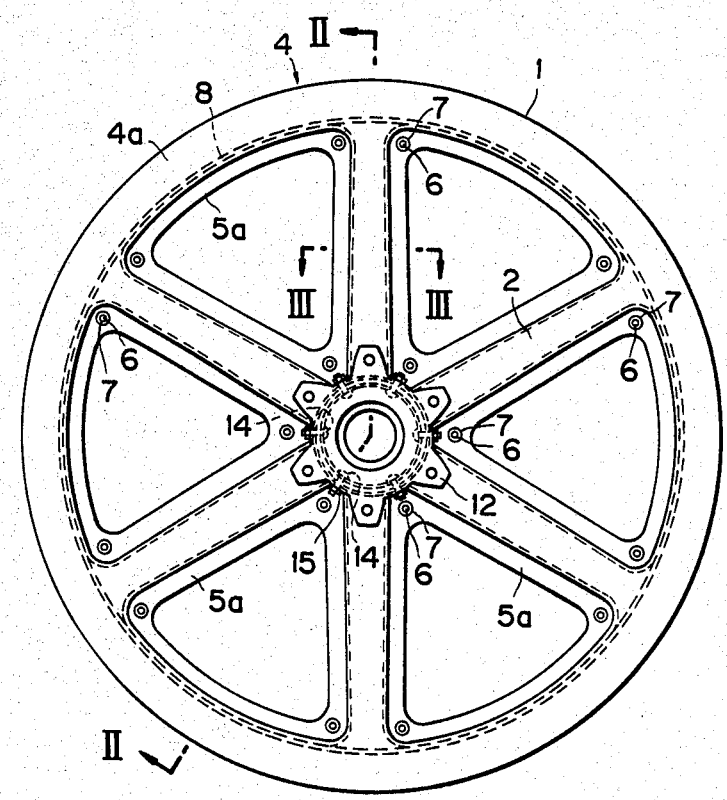
FIG. 1 is a front view of a wheel for vehicles according to a first embodiment of the invention.
Figure 3:
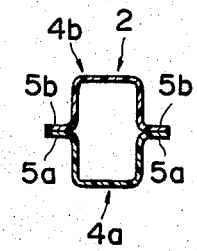
FIG. 3 is a sectional view of the wheel taken along line III—III of FIG. 1.
Figure 2:
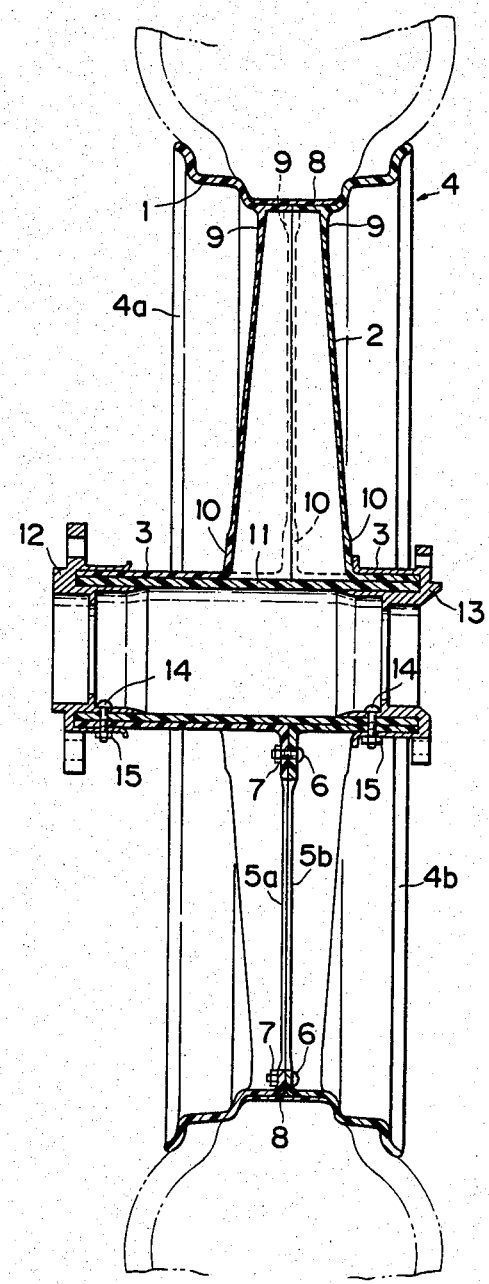
FIG. 2 is a sectional view of the wheel taken along line II—II of FIG. 1.

Referring first to FIGS. 1 to 3, a wheel body 4 is made of a fiber-reinforced resin. The wheel body 4 consists of a rim portion 1, a plurality of spoke portions 2 and a hub portion 3 integrally joined together. The wheel body 4 integrally formed of the rim portion 1, the spoke portions 2 and the hub portion 3 is divided symmetrically relative to a plane perpendicular to the axle direction so as to be composed of left and right halved bodies 4a, 4b. The halved bodies 4a, 4b are formed at their joint edges thereof with respective joint flanges 5a, 5b extending along the inner circumference of the rim portion 1 and on both sides of each spoke portion 2. The joint flanges 5a, 5b have their joint faces thereof correspondingly abutted to be joined together with a bonding agent and firmly fastened together with bolts 6 and nuts 7. The further fastening may be effected with any other suitable mechanical fixing means such as a rivet. Moreover, after the fastening, by way of a filament winding method, the wheel body may be wound with fibers reinforced by impregnation with a resin. In this embodiment, in the course of joining the halved bodies 4a, 4b, a ring 8 formed in advance using the fiber-reinforced resin is fitted on the outer circumference of the rim portion 1, thereby raising the joining strength between the halved bodies 4a, 4b as well as increasing the ring rigidity of the wheel body 4 itself. Further, by the provision of the ring 8 on the outer circumference of the rim portion 1, an improvement in the prevention of air leaks is obtained from the joined portion when a tubeless tire is used.

As shown in FIG. 3, each of the spoke portions 3 in the halved body 4a or 4b is shaped substantially in the form of a Japanese Katakana letter "KO" or a channeled section having at its both edges a pair of flanges 5a or 5b. When the halved bodies 4a, 4b are joined together, a square-like hollow core is formed. Additionally, as will be apparent from FIG. 2, the depth of each section gradually becomes wider towards the center of the wheel body 4. Furthermore, between the rim portion 1 and each spoke portion 2 and between the spoke portion 2 and the hub portion 3, respective connecting portions 9 and 10 have increased thicknesses, thereby raising the strength as well as the rigidity of the wheel body to a considerable degree.

The hub portion 3 of the wheel body 4 as the halved bodies 4a, 4b are joined together has a cylindrical member 11 in its inner circumference thereof. The cylindrical member 11 is made of the fiber-reinforced resin and is adhered to the inner circumference of the hub portion.

Further, the hub portion 3 has at its left and right ends thereof bearing members 12 and 13, respectively. The bearing members 12 and 13 are adhered to the hub portion by the fitting of disc plates or the press-in of bearings. The bearing members 12, 13, which are made of a light alloy metal such as of aluminum and magnesium, are further firmly fastened to the cylindrical member 11 by using bolts 14 and nuts 15. This fastening may be effected with other suitable means such as a rivet.

In the foregoing description, the fiber-reinforced resin may be of a material having a matrix such as an epoxide resin, a polyester resin and a phenol resin reinforced with filaments such as carbon fibers, aromatic polyamide fibers, glass fibers, silicon carbide fibers, boron fibers and alumina fibers. By using such a material, the halved bodies 4a, 4b, the cylindrical member 11 and the like may be formed by way of a matched die method. a hand layup method, the filament winding method or the like.

The wheel body 4, which is assembled in this embodiment by integrally joining the halved bodies 4a, 4b, may be formed from the first and a single body as a matter of course without prejudice to the subject matter of the invention.

According to this embodiment, in which an entire wheel body excluding a bearing portions is formed by using a fiber-reinforced resin, a wheel for vehicles will be permitted to have its weight reduced by 30% to 40% when compared with an aluminum wheel of same configuration and by 60% to 80% when compared with a steel wheel, thus enabling the fuel consumption to be reduced as well as an improvement in various functions of the vehicle. Additionally, because a rim portion, a plurality of spoke portions and a hub portion are formed to be integral, the number of joining parts can be successfully reduced. Moreover, after the joining, additional finish work such as for a light alloy metal wheel is not needed, thus reducing the manufacturing cost as well. Further, the use of fiber-reinforced resin permits a relatively large freedom of design. Besides the above, by rendering the bearing portion metallic, the hub portion may have its resin configuration thereof simplified in comparison with a wheel having its bearing portion thereof made of a fiber-reinforced resin, thus resulting in an increase in productivity and the like.

Figure 4:
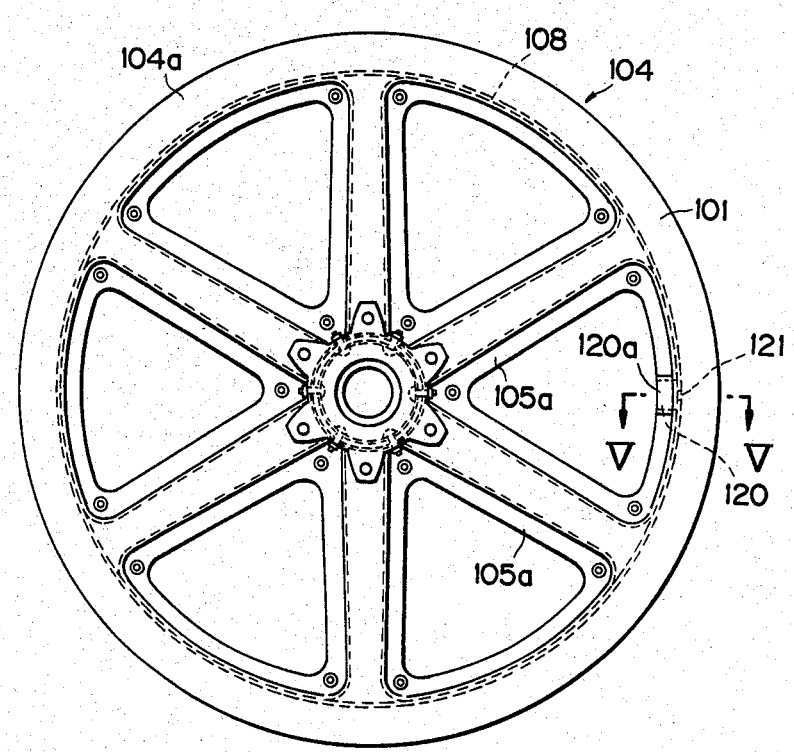
FIG. 4 is a front view of a wheel for vehicles according to a second embodiment of the invention.
Figure 6:
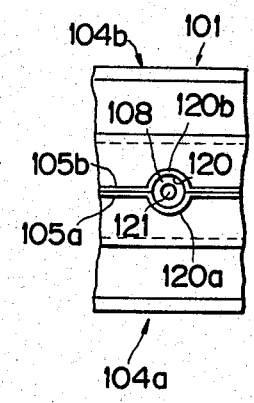
FIG. 6 is a side view of FIG. 5.
Figure 5:
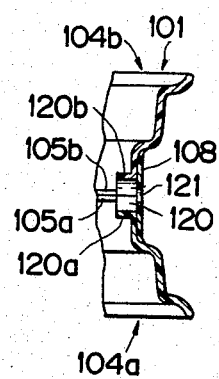
FIG. 5 is a sectional view of the wheel taken along line V—V of FIG. 4.

Referring now to FIGS. 4 to 6, a wheel body 104 is shown which is similar to the wheel body 4 of the first embodiment of the invention. The wheel body 104 includes a rim portion 101 having in its halved body joining area thereof, a cylindrical portion projecting radially inwardly of the wheel body 104. The cylindrical portion is formed therethrough with an air valve fitting hole 120. Namely, as shown in FIGS. 5 and 6, the air valve fitting hole 120 is defined by a pair of semicylindrical portions 120a, 120b having their joint flanges 105a, 105b integrally formed thereon to increase the strength in the halved body joining area.

Moreover, a ring-like plate 108 formed in advance by using a fiber-reinforced resin is adhered to the outer circumference of the rim portion 101, thereby increasing the joint strength of a pair of halved bodies 104a, 104b. The ring-like plate 108 is formed therethrough with an air valve inserting hole 121 positioned so as to correspond with the air valve fitting hole 120.

Instead of the ring-like plate 108, a plate of an arcuate form or any other suitable configuration may be provided.

Figure 7:
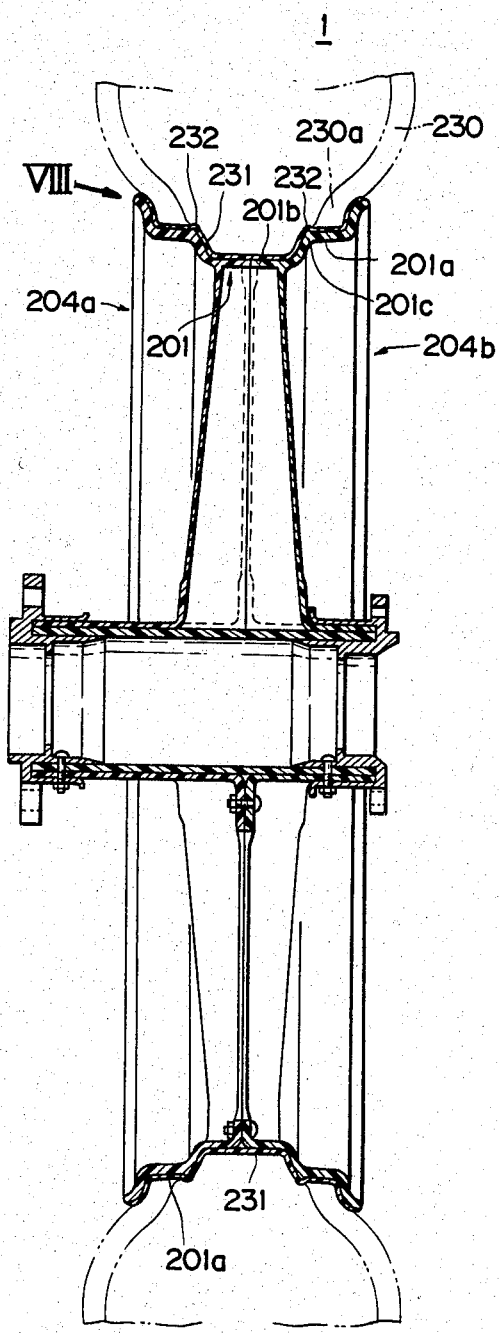
FIG. 7 is a sectional view of a wheel for vehicles according to a third embodiment of the invention.

Referring now to FIG. 7, a wheel body 204 is shown which is similar to the wheel body 4 of the first embodiment of the invention. The wheel body 204 is composed of left and right halved bodies 204a, 204b which are pre-molded.

The molding of the halved bodies 204a, 204b constituting the wheel body 204 may include the steps of laminating a ring and a reinforcing fiber in respective metal forms, hardening to mold the same and removing from the forms before subjecting to a finishing. These halved bodies 204a, 204b are joined together to form the wheel body 204 including a rim portion 201 which may have on its surface thereof 201a to be fitted with a tubeless tire 230, a fine but certain unevenness due to blowholes in the molding process. Additionally, between the halved bodies 204a, 204b, there may be found fine gaps in the joint area of the rim portion 201, thus adversely affecting the airtightness of the tubeless tire 230 fitted on the rim portion 201.

In this concern, the rim portion 201 has its outer surface 201a thereof coated with a synthetic resin, namely, has a synthetic resin layer 231 formed on the rim surface 201a, thereby filling up gaps in the joint area as well as any unevenness on the surface 201a. This smoothing of the rim surface 201a, favorably improves the airtightness at the joint area of the rim portion 201 and between the rim surface 201a and the tubeless tire 230 in contact therewith at a portion 230a. Moreover, the synthetic resin layer 321 serves as a reinforcement of the rim portion 201, while being effective as well for the accuracy correction against vibrations the rim portion 201 may undergo when running.

The synthetic resin to be coated may be an epoxide resin and the coated layer thickness may be within a preferable range of 5 to 50 micrometers.

The foregoing description of this third embodiment of the invention has been related to an example with a tubeless tire, whereas even in the case of a tubed tire the airtightness is maintained to be effective for the prevention against intrusion of water.

Figure 8:
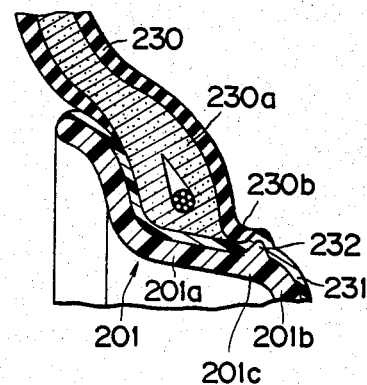
FIG. 8 is an expanded view of an arrowed portion VIII of the wheel of FIG. 7.

Referring now to FIG. 8, the rim portion 201 has along the outer circumference thereof a well portion 201b recessed therein between a pair of flat bead seat portions. On each shoulder 201c between the well portion 201b and either bead seat portion, there is projectingly formed a bead stopper 232 around the whole circumference of the rim portion 201. A plurality of point or arcuate bead stoppers may be formed spaced at suitable distances in the circumferential direction. The bead stopper 232 may be made of a synthetic resin, a synthetic rubber or a fiber-reinforced resin.

The bead stopper 232 may be integrally joined to the rim portion 201, after molding the wheel body 204, through the steps of applying a synthetic resin or a fiber-reinforced resin to the inside of a simple form defining a cavity for the formation of the bead stopper 232, setting the rim portion 201 in place thereon and exerting a hardening pressure thereon thereby to join them together. In case the bead stopper 232 is made of the same fiber-reinforced resin as the rim portion 201, they may be integrally formed concurrently.

The tubeless tire 230 has a pair of bead portions 230a press-joined to be fitted on the bead seat portions, the bead portions having there inside portions 230b thereof either engaged to be stopped with the corresponding bead stopper 232. In this manner, the bead portions are preferably prevented from slipping down from the shoulder 201c into the well portion 201b or getting out of the rim portion 201.

Although there have been described what are at present considered to be the preferred embodiments of the invention, it will be understood that the present invention may be embodies in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. A wheel for vehicles comprising a wheel body having a rim portion, a plurality of spoke portions, and a hub portion; and a pair of bearing members provided at the left and right sides of said hub portion; said wheel body being integrally made of a fiber-reinforced resin: and being composed of left and right halved bodies which are symmetrical with each other relative to the center plane of the wheel body and are integrally joined with each other; each spoke portion having a square hollow cross section, with each respective spoke portion of the left and right halved bodies having matching flanges extending in said center plane, said matching flanges being joined together by a bonding agent and mechanical fastening means; said rim portion having a circumferential synthetic resin coating and an integrally formed cylindrical projection projecting radially inwardly and formed therethrough with an air valve fitting hole.

2. A wheel according to claim 1, wherein: said rim portion has a ring plate fitted circumferentially thereon, and said ring plate is formed therethrough with an air valve insertion hole overlapping on said air fitting hole.

3. A wheel according to claim 1, wherein: said outer circumference of said rim portion has a bead stopper integrally formed thereon.

4. A wheel according to claim 3, wherein: said bead stopper is made of said fiber-reinforced resin.

5. A wheel according to claim 1, wherein: said bearing members are made of a light alloy metal.

* * * * *